United States Patent [19]

McCracken

[11] Patent Number: 5,055,683
[45] Date of Patent: Oct. 8, 1991

[54] LINE SCANNER

[76] Inventor: William L. McCracken, 113 Woodridge Rd., Wayland, Mass. 01778

[21] Appl. No.: 451,105

[22] Filed: Dec. 15, 1989

[51] Int. Cl.$^5$ .............................................. H01L 25/00
[52] U.S. Cl. .................................... 250/334; 250/332; 250/349
[58] Field of Search ........................ 250/332, 334, 349

[56] References Cited

U.S. PATENT DOCUMENTS

| | | | |
|---|---|---|---|
| 3,562,529 | 2/1971 | Engborg et al. | 250/334 |
| 4,196,508 | 4/1980 | Lorenze | 29/577 |
| 4,234,789 | 11/1980 | Fournet | 250/234 |
| 4,479,695 | 10/1984 | Neil | 350/1.3 |
| 4,670,653 | 6/1987 | McConkle et al. | 250/330 |
| 4,935,629 | 6/1990 | Livermore et al. | 250/349 |
| 4,952,809 | 8/1990 | McEwen | 250/342 |

Primary Examiner—Carolyn E. Fields
Assistant Examiner—James E. Beyer
Attorney, Agent, or Firm—George A. Leone, Sr.

[57] ABSTRACT

A line scanning apparatus includes a cylindrical housing which holds a spin mirror, a detector array, a multiplexer assembly, an analog-to-digital converter, a shaft encoder, digital processing apparatus and memory storage devices. Inertial navigation system (INS) reference information, including velocity-to-height ratio data is provided. The line scanning apparatus further includes optics for focusing radiation which is reflected into the optics by the spin mirror which is inclined at about a 45° angle to the optical axis. The detector array comprises a plurality of radiation detector cells which provide a plurality of synchronously sampled signals representative of the amount of radiation impinging on the detector array at any given time. The spin mirror is attached to a spin mirror motor which is further attached to the shaft encoder. The shaft encoder provides positional data to the digital processing apparatus wherein the positional data represents the spin mirror orientation correlated to a particular period in time. The memory device stores the radiation signals and the synchronous positional data further comprised of array displacement coordinate information which is synchronously correlated to the digital radiation signals. An address control device is arranged to load data into a frame buffer for correction of time delays resulting from the apparent array rotation by compensating for the time delays for applying the displacement information to the corresponding sampled signal. An approximately constant along track swath width per scan results and more readily interpreted imagery results thereby.

20 Claims, 4 Drawing Sheets

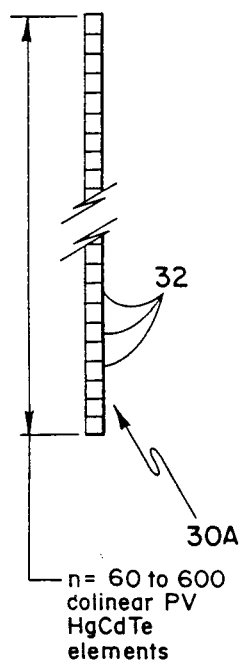
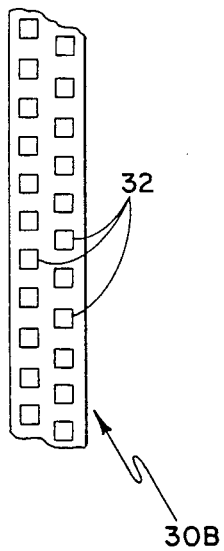
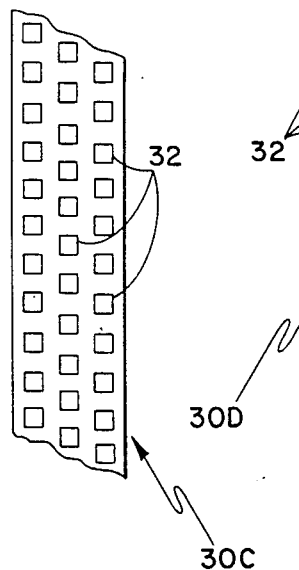
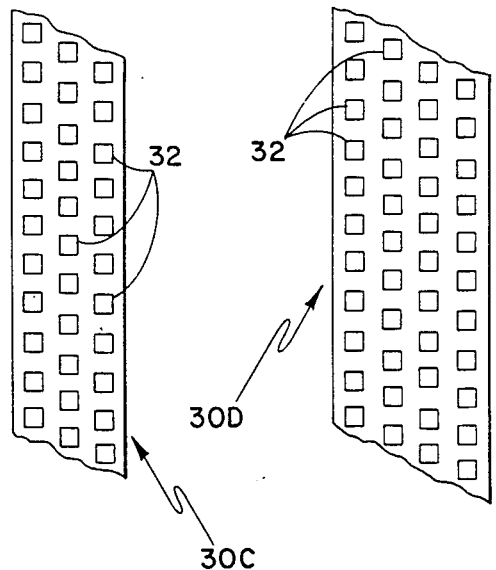
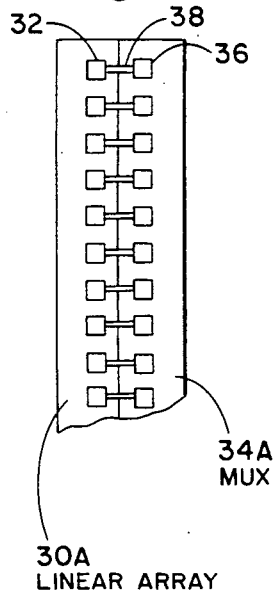
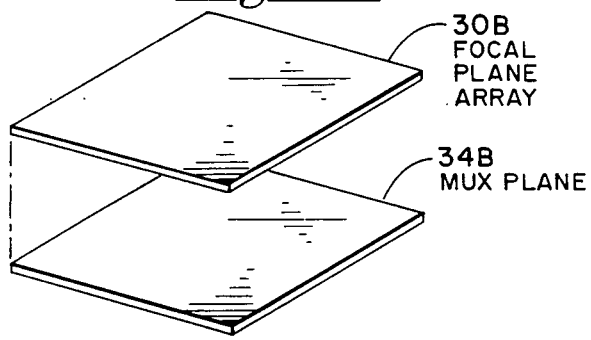
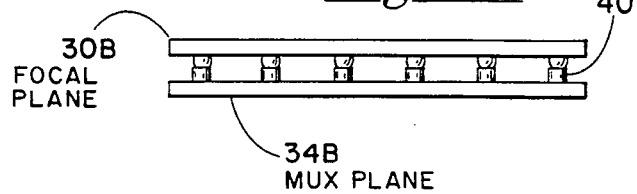

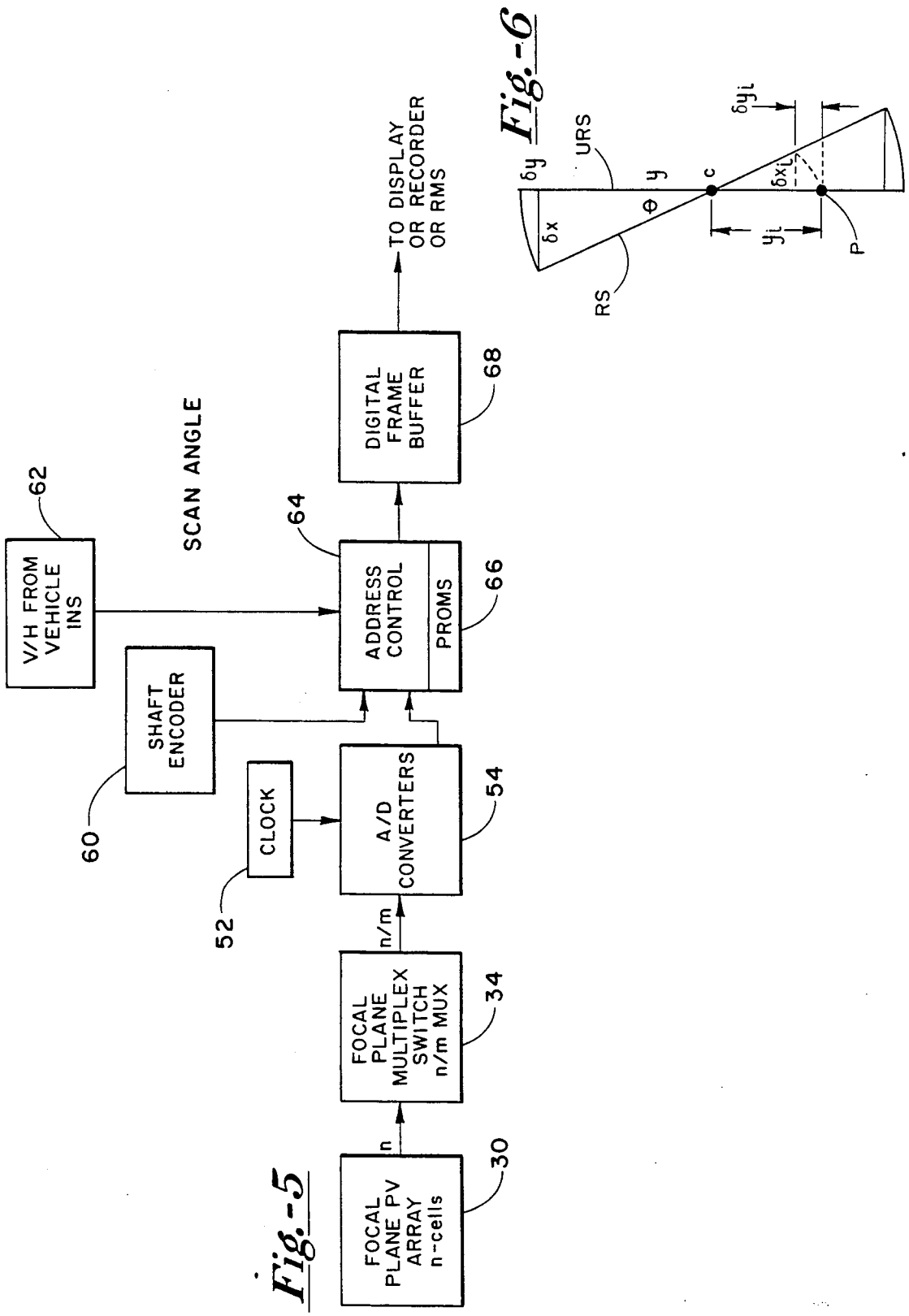

LINE SCANNER

The present invention is concerned generally with radiation detection apparatus and, more particularly, it is directed to an improved airborne infrared line scanner which employs image rotation and a 45° scanner to provide a more constant along track (ALT) swath width on the ground as the device scans and further utilizes defocus effects to advantage by combining such effects with digital image processing.

BACKGROUND OF THE INVENTION

Airborne opto-mechanical scanners have been found to be very useful devices because they produce a strip map optical image of the terrain overflown by an aircraft. They are capable of covering a very large area in a single flight and provide imagery superficially like aerial photography. By far, the greatest application of line scanners has been in the infrared spectral regions especially in the two so-called atmospheric window bands, namely 3-5 micrometers and 8-14 micrometers in wavelength. To a lesser extent such devices have been used at shorter wavelengths such as the visible spectral band and with active laser scanning at various laser wavelengths. The present invention applies primarily to passive infrared imaging in these two infrared window bands but the invention could apply as well to visible or near infrared wavelengths.

The earliest airborne infrared line scanners used a scanner type called an "axe-head" scanner because they typically employed a scan mirror having two scanning mirror surfaces resembling a chisel or a blunt axe head in form. Numerous scanners of this type are well-known to the art and have flown successfully from the 1960s to the present. Several disadvantages of this type of scanner led to their replacement as the preferred airborne infrared line scan device. Among these disadvantages were the fact that the 45 degree angle placement of each scan mirror surface caused the image to rotate as the scan progressed from one horizon to the other. In fact the amount of rotation is 180° and is symmetrical about the midscan, or nadir position directly below the aircraft. This rotation of the image causes the image of a road, for example, to appear s-shaped even though the road is perfectly straight and aligned parallel to the scan dimension which is transverse to the line of flight of the aircraft. Such s-shaped distortion not only makes the imagery more difficult to interpret but it also limits the number of detectors which can be placed in linear array in the along track, or flight, direction. It is very useful to employ a linear array of detectors aligned parallel to the flight direction because such an array with a plurality of detectors allows more than one channel of information to be collected for each scan. Another way of expressing this advantage is to say that a linear array with a plurality of detectors has a greater along track coverage. As a consequence, for a given velocity-to-height (V/H) ratio it is possible to keep a contiguous and continuous coverage using fewer scans per second. It is a distinct advantage to be able to keep up with the maximum V/H ratio while using a lower scan mirror rotation rate because reliability increases, electrical power to the scan drive is greatly reduced, and windage and noise are also reduced. Early scanners were not used for high V/H missions because image rotation limited the number of parallel channels to one or two and to provide the increased V/H capability it was necessary to scan at unacceptably high rotation rates such as 12,000 rpm.

Split aperture scanners, such as the Kennedy scanners, began to replace axehead scanners in the 1970 decade. The split aperture type of design had the decided advantage of not causing image rotation as the scan progressed but they used a more complicated optical design and required two optical fold mirrors on either side of the prismatic section scan mirror in order to receive the scanned radiation and fold it ultimately to a focus on the detector focal plane. The split aperture design line scanners used prism shaped scan mirrors which had either three or four facets. Each facet theoretically scans at least 180° of transverse scan angle, but often less than this amount was used because of the inherent distortions in such line scanners. The most annoying of these distortions is called bow-tie distortion and occurs because the fixed along track angular subtense of the linear array of detectors is scanned along the ground transversely and hence, the ground subtense, or ground footprint of the array grows as the scan angle from nadir increases. Because the aircraft moves forward a constant distance during each scan period there will be an eventual overlap beyond a certain scan angle before or after nadir (defined herein as 0 degrees scan angle). This overlap at the higher scan angles causes a loss of information that renders the imagery useless at scan angles in excess of $+/-60°$ unless channels are dropped from the image recording process in a dynamic manner as the scan progresses from nadir. Prior to reaching nadir it is necessary to start with one or two channels (depending on V/H) and to stepwise symmetrically add channels up to the maximum number required at nadir for a given V/H ratio. This technique was known in the prior art but because of electronic complexity, was seldom used until the decade of the 1980s when digital electronic signal processing was added to reconnaissance systems.

The split aperture design provides a reasonably uniform aperture over the major portion of the required fields of view specified by the user community up until the mid 1980s. This feature results from the fact that as one aperture decreases during the scan the other aperture increases. At nadir both apertures are equal. The split aperture designs sum both images at the focal plane and one disadvantage of such designs is the requirement to adjust and maintain this alignment over the full range of vibration and thermal environments of the intended use. Another disadvantage of the split aperture designs is that the across track dimension of each single aperture varies with the scan angle and, hence, its diffraction modulation transfer function (MTF) can have a very low value at certain scan angles, thus degrading the resolution from that aperture. It is not possible to consider the dimension of the combined across track aperture in the evaluation of the diffraction MTF because the infrared radiation is not coherent by virtue of the fact that the optical path length to the focal plane differs between the two adjacent left and right apertures by many wavelengths. It is common practice in the design of such split aperture optics to employ a much larger dimension for the along track (ALT) aperture as compared to the across track (ACT) aperture. For example, at nadir, where the across track (ACT) apertures are equal one could make each ACT aperture to be one inch wide and employ an ALT aperture of 5 inches in length. This causes a drastic difference in the MTF values from diffraction in the two dimensions. This disadvantage is usually overcome by the use of electronic MTF boost in each of the signal processing amplifiers to increase the system across track MTF to acceptable levels and hence, to achieve the desired resolution. An undesirable consequence of the MTF boost is that electronic noise is also boosted and thus, the overall signal-to-noise ratio is diminished. Both the axehead scanners and the split aperture scanners have a limited collecting aperture in proportion to their overall size. The axehead scanner has a lower scan efficiency in comparison to the split aperture types because it typically uses only one or two scan mirror facets per revolution and if more facets are used the scan mirror axehead becomes impractically large. It should be noted that the axehead scanner has a constant aperture MTF with scan angle and if only one 45 degree angle scan mirror facet is used to fill the telescope aperture it is possible to have a large aperture and hence, a large collection area in a small overall cylindrical envelope. This fact has been known to those skilled in the art for many years and such a variation of the axehead scanner has formed the basis for many radiometric imagers used by NASA and by the scientific and weather community of investigators on satellites and aircraft.

In discussing previous state of the art line scanners it should be noted that there is a continuing and urgent need to make improvements in the following areas.

The present scanners are too large for many applications in pods, smaller aircraft, and especially in remote piloted vehicles (RPVs) where the scanner width in particular is too large for the allowable installation diameter.

The present scanners are too heavy for many of their intended uses. The payload capability of many RPVs is severely limited and even if the RPV is capable of lifting the scanner weight its flight range would be improved with any weight reduction.

The present scanners have an excessively high cost for many uses. It would be very beneficial if a low cost small infrared linescan sensor could be developed for RPV use in applications where there is a high probability that the RPV will be lost or have at best a limited lifetime. It is contemplated that such RPVs would be deployed in large numbers where RPVs offer many cost and human benefits compared to manned airborne reconnaissance.

The present scanners are too difficult to maintain in the field and require expensive aerospace ground equipment and extensive training with skilled personnel.

Present linescan systems generate a very high instantaneous data rate which greatly complicates the recording of the imagery unless a substantial amount of data compression and processing is employed on data received from the line scanner.

The use of axehead scanners is limited to low V/H values. Further, they suffer from image rotation s-distortion. While split aperture scanners are not limited to low V/H values and do not rotate the image, they suffer from bow-tie or overlap distortions. Both types of scanners employ fixed infinity focus optical telescopes. Therefore, when using such scanners, a significant amount of defocus occurs which limits resolution at the closer slant ranges that are encountered at low altitudes up to approximately 1000 ft.

OBJECTS, ADVANTAGES AND FEATURES OF THE INVENTION

It is one object of the invention to provide a line scanner which represents a substantial improvement because it is sufficiently narrow in width and can be readily installed in most pods and RPVs.

It is a further object of the invention to provide a line scanner which is substantially easier to manufacture, align and maintain. The line scanner provided by the invention has improved environmental performance, a substantially lower per unit cost and lower overall cost of ownership because of easier maintainability and higher reliability.

It is a further object of the invention to provide a line scanner which produces an approximately constant ground footprint across the scan line for each detector channel. With this feature the invention produces an image in which an image of a target object, such as a vehicle below the aircraft at nadir position, occupies substantially the same image length in the ALT dimension as an equal sized vehicle viewed at other positions of the scan. In order to accomplish this end result it is a further aim of the invention to exploit the defocus effect in the fixed infinity focus telescope of the line scanner advantageously so as to provide the desired result in a simple manner.

It is a further object of the invention to advantageously exploit the image rotation inherent in a scan mirror set at 45° so as to maximize the use of the detectors in a linear photovoltaic array so as to effectively match the ALT subtense required for the specific value of $V/R = (V/H) \cos \theta$ required to produce a contiguous coverage scanning of the scene. This feature of the subject invention assures that all detectors are used in the most effective and efficient manner in order to provide the desired scan pattern. A further advantage results from the image rotation because at the extremes of the scan, namely at approximately (+/−) 90°, when the scanner is viewing at extreme slant ranges near the horizon it is important to improve the sensitivity of the scanner as much as is practical because of the atmospheric attenuation, especially at low aircraft altitudes. This is accomplished in the invention by exploiting the effect that at the scan extremes of (+/−) 90° the array has rotated 90° from its relative position at nadir where it is aligned to the flight direction. At the horizons the array is aligned with the scan direction such that each of the n detectors of the array will successively scan the same scene element at the two horizons, where n is an integer number. This sequential scanning of the same element can be exploited to improve the signal-to-noise ratio using the well-known "delay and add" signal processing technique. The signal-to-noise ratio improves by the square root of n for n sequential samplings of the same scene element provided that the signals from the individual detector elements are properly delayed and added together in phase. This is achieved by the invention with modern digital signal processing and storage techniques at reasonable cost while previously such processing was only accomplished at great cost and complexity.

It is a further object of the invention to provide an opto-mechanical package that fits into a minimum diameter cylindrical envelope and which uses a maximum number of simple cylindrical structural elements for purposes of rigidity, ease of manufacture and lower cost. In the preferred embodiment of the invention the effective aperture of the optical telescope can be between about 5 and 6 inches in diameter so that diffraction limited imaging is possible at high signal-to-noise ratios.

It is a further object of the invention to minimize the rotation rate needed for contiguous coverage scanning at high V/H ratios such as, for example, between about 1.0 radian per second and 5.0 radian per second. This is achieved in the invention by the use of wide field optics in conjunction with a linear array of up to several hundred photovoltaic detector elements using an electrically multiplexed readout electronics method. For example, in a previous state-of-the-art split aperture line scanner it is necessary to employ six parallel detectors in linear array with a scan rate of 400 scans per second in order to provide contiguous scan coverage at maximum V/H ratio. The preferred embodiment scanner of the invention can, for example, employ a 300 element array so that the scan rate for the same V/H is drastically reduced to 8 scans per second. Intermediate reductions in scan rate are possible. There is obviously a cost versus scan rate tradeoff. A reduced scan rate requirement has the advantage of requiring less power and a smaller drive motor can be used. There is also less windage, less acoustical noise and less distortion in the rotating large scan mirror. It should be noted that the use of photovoltaic detectors is especially advantageous in scanners operating in the infrared window spectral bands because the photovoltaic detectors do not require the electrical bias that photoconductive detectors require and hence, it is therefore much easier to cool the array to its required cryogenic operating temperature.

The numerous advantages and features of the invention will be apparent to those skilled in the art of airborne reconnaissance and in particular, those skilled in the art of infrared linescan design for airborne tactical reconnaissance but the invention is also valuable for airborne surveillance and earth resources measurements. For example, the invention is useful for the detection of forest and brush fires as well as the detection of crop damage from plant disease and for land use studies, weather studies, soil erosion studies and similar applications.

Other objects, features and advantages of the invention will become apparent to those skilled in the art through the Description of the Preferred Embodiment, claims and drawings herein wherein like numerals refer to like elements.

SUMMARY OF THE INVENTION

In accordance with the invention an improved line scanner is provided for reconnaissance and surveillance which is particularly useful for infrared wavelengths. The line scanner includes line scanning apparatus, infrared detector arrays and digital processing apparatus. The line scanning apparatus includes a cylindrical housing which holds a spin mirror, a detector array, a multiplexer assembly, an analog-to-digital converter, a shaft encoder, digital processing apparatus and memory storage devices. Inertial navigation system (INS) reference information, including velocity-to-height ratio data is provided from the inertial navigation system of the aircraft or from other external systems. The line scanning apparatus further includes optics of focusing radiation which is reflected into the optics by the spin mirror which is inclined at approximately a 45° angle to the optical axis. The detector array comprises a plurality of radiation detector cells which provide a plurality of synchronously sampled signals representative of the amount of radiation impinging on the detector array at any given time. The multiplexer assembly has a plurality of multiplexer channels wherein each multiplexer channel is connected to one of the detector cells so as to receive the synchronously sampled signals into the analog-to-digital converter. The analog-to-digital converter converts the sampled signals received from the multiplexer into digital radiation signals, that is, digital signals which are digital representations of the radiation impinging on the detector array. The spin mirror is attached to a spin mirror motor which is further attached to the shaft encoder. The shaft encoder provides positional data to the digital processing apparatus wherein the positional data represents the spin mirror orientation correlated to a particular period in time. The memory device stores the digital radiation signals and the synchronous positional data. The synchronous positional data is further comprised of array displacement coordinate information which is synchronously correlated to the digital radiation signals. Connected to the memory device is an address control device which is arranged to load data into a frame buffer for correction of time delays resulting from the apparent array rotation by compensating for the time delays by applying the displacement information to the corresponding sampled signal in accordance with the following equations which are applied prior to loading the frame buffer.

$$\sin \theta = \delta x/(\phi_{ALT}/2) \qquad (EQ. 1),$$

$$\delta x = (\phi_{ALT}/2) \sin \theta \qquad (EQ. 2)$$

$$\cos \theta = y/(\phi_{ALT}/2) \qquad EQ. 3),$$

$$y = (\phi_{ALT}/2) \cos \theta \qquad (EQ. 4)$$

$$\delta y = (\phi_{ALT}/2) - y = (\phi_{ALT}/2)(1 - \cos \theta) \qquad (EQ. 5)$$

where $\theta$ is the scan angle from nadir, $\phi_{ALT}$ is the along track angular coverage per scan, y is the detector position referenced to the center of the array, $\delta y$ is the ALT displacement coordinate, and $\delta x$ is the ACT displacement coordinate.

The information may be displayed or transmitted from the frame buffer to downstream equipment for processing.

In the preferred embodiment of the invention, the detector array is advantageously comprised of photovoltaic mercury cadmium telluride (PV HgCdTe). The detector array may be a linear array or a staggered array. Other photovoltaic detector materials such as silicon, platinum silicide, indium antimonide, lead tin telluride or other intrinsic or extrinsic materials may be advantageously used in the invention for sensing visible and infrared radiation.

BRIEF DESCRIPTION OF THE DRAWINGS

FIGS. 2A-2G schematically show more detailed views of infrared detector arrays and array/multiplexer assemblies which are advantageously employed by the invention.

FIG. 5 is a schematic block diagram of signal processing flow in accordance with the present invention.

FIG. 6 illustrates array displacement coordinates as used in the signal processing method of the invention and as included in Equations 1-5 herein.

DESCRIPTION OF THE PREFERRED EMBODIMENT

Figure 1A:
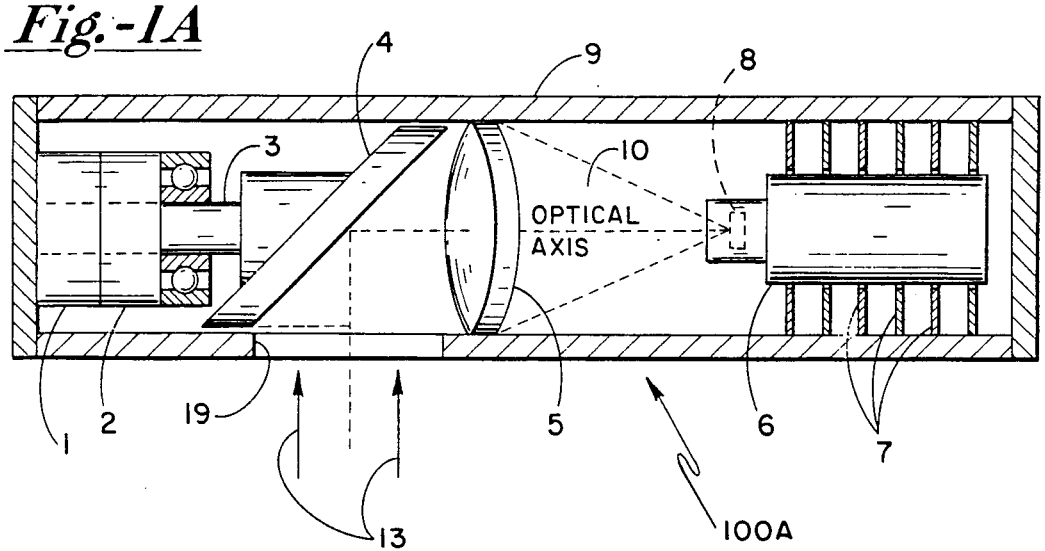
FIG. 1A is a schematic diagram of one embodiment of a line scanner provided in accordance with the present invention using a refractive optical telescope.

Referring now to FIG. 1A, a schematic diagram of one embodiment of a line scanner provided in accordance with the present invention is shown. The line scanner comprises a cylindrical housing 9 having an opening 19 which allows radiation 13 into the housing over the range of desired scan angles. The housing holds spin mirror 4, optics 5, printed circuit cards 7, infrared Dewar assembly 6, a spin mirror shaft and bearings 3, an optical encoder 1 and a spin motor 2. The shaft and bearings assembly 3, spin motor 2, optical encoder and spin mirror 4 are mounted together in a conventional manner. The optics 5 advantageously comprise an infrared focusing lens assembly which may be a simple doublet or equivalent refractive optics having an optical speed in the range of about F/1.0 to F/1.5. The spin mirror 4 is advantageously fabricated as an elliptically shaped spin mirror which is inclined at approximately 45° with respect to the optical axis of the optics 5. The spin mirror may be advantageously fabricated from foam-cored diamond machined aluminum or materials with similar reflective properties. The infrared Dewar assembly may be made in accordance with conventional methods. Mounted within the infrared Dewar assembly and arranged to receive the focused infrared radiation from the optics 5 is the detector array 8 which may be comprised advantageously of a photovoltaic HgCdTe focal plane assembly and a readout multiplexer as will be discussed further hereinafter. The printed circuit cards 7 may preferably be ring shaped so as to maximize space usage within the housing. The circuit cards 7 advantageously include electronics for an analog-to-digital converter, memory devices, address control devices, a frame buffer, and other electronics typically employed in an infrared detection system including a phase-locked-loop servo drive for rotation of the spin motor.

The scan mirror 4 is fixed to the shaft 3 which rotates about the optical axis of the optics 5 and which is driven by the spin motor driven by a phase locked loop servo drive such that the rotation rate is controllable either to a fixed or a variable rate as required. The optics 5 can be either a simple refractive type telescope as illustrated herein by FIG. 1A, or can be an all reflective folded telescope or can be of a catadioptric design. The optical speed of the refractive telescope of FIG. 1A is preferably F/1.0 for minimum detector size and, hence, minimum detector noise for a given instantaneous field of view. Since the scan mirror is elliptical in shape, its projection at 45° is circular in shape and, hence, the aperture of the scanner optics 10 is circular. In the preferred embodiment of the scanner as shown in FIG. 1, this aperture is preferably about 6 inches in diameter. However, those skilled in the art will recognize that the invention provides for the use of other aperture diameters.

Figure 1B:
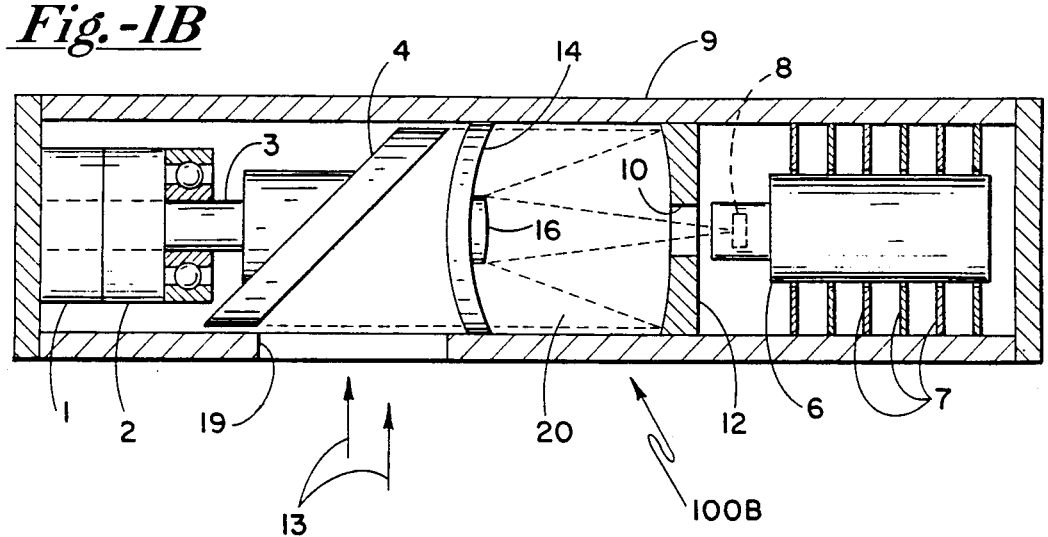
FIG. 1B is a schematic diagram of another embodiment of a line scanner provided in accordance with the present invention using a catadioptric telescope.

Referring now to FIG. 1B an alternate embodiment of the invention is shown wherein the optics comprise a folded catadioptric telescope including a corrective concentric spherical lens 14 upon which a secondary reflective mirror 16 is concentrically mounted so as to receive reflected radiation from a primary mirror 12. The other line scanner elements are essentially as described and shown in FIG. 1A. The catadioptric telescope may be a Maksutov-Bouwers, Schmidt or equivalent style telescope.

Figure 1C:
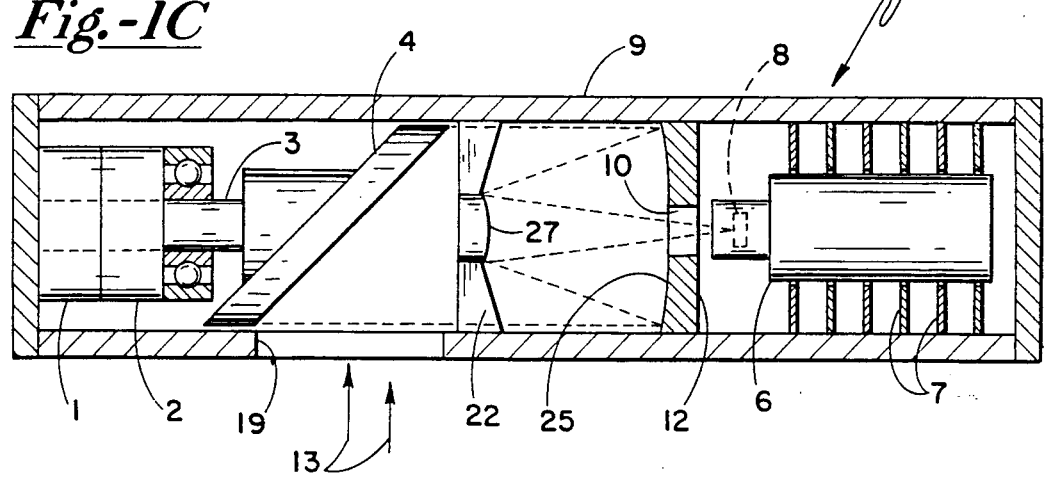
FIG. 1C is a schematic diagram of yet another embodiment of a line scanner provided in accordance with the present invention using a folded, all reflective telescope.

Referring now to FIG. 1C another embodiment of a scanner as provided in accordance with the present invention is shown having a folded all reflective telescope. The folded all reflective telescope comprises a secondary mirror 27, having spider supports 22 for focusing and reflecting radiation from the primary mirror 25 through opening 10 onto the detector array 8.

Now referring to FIGS. 2A-2G, various details of the preferred and alternate embodiments of the detector array are shown. FIG. 2A shows a linear array of photovoltaic mercury cadmium telluride detectors optimized for use in the 8-12.5 micrometer spectral band and advantageously used in conjunction with a CMOS electronic multiplexer for readout of the array by sequential blocks of detectors into a reduced number of signal processing channels. The array has n detectors in a linear pattern which, at nadir, is aligned in parallel to the aircraft flight direction and normal to the scan direction. FIG. 2A shows the detector array schematically with the detectors being almost contiguous. The present invention does not require that the individual detectors be completely contiguous because the present invention takes advantage of defocus effects which require lower resolution of ground details viewed at nadir than radiation viewed at either horizon where the highest resolution is required.

The invention, therefore, encompasses array designs which range from those which are contiguous. For example, the detector arrays used with the invention may be of staggered design such as shown in FIG. 2B, 2C and 2D. In such design successive elements are displaced in the across track dimension. FIG. 2B shows a dual staggered array 30B having elements 32. FIG. 2C shows a triple staggered array 30C having elements 32. FIG. 2D shows a quadruple staggered array 30D comprised of similar detector elements. The linear array shown in FIG. 1A may be a single linear array comprised of approximately 60 to approximately 600 colinear PV HgCdTe elements with totally evaporated leadout (TEL) connections to multiplexer electronics as is shown in FIG. 2E. Referring now to FIG. 2E, the focal plane array 30A having elements 32 is connected by TEL connection 38 to input 36 to a multiplexer channel in multiplexer electronics 34A.

Alternatively, the staggered arrays may be arranged into a focal plane array 30B, for example, which may be bump interconnected to a multiplexer plane 34B as is shown in FIG. 2F and 2G with bump interconnects 40. TEL connections and bump interconnection methods for focal plane arrays and multiplexer electronics are well known in the art. Typically indium or indium alloy is used for the bump material.

In FIG. 2A, the array is purely linear in that all elements are co-located on a single line. The staggered array designs can include the use of 2, 3 or more rows in a staggered pattern as shown in FIGS. 2B, 2C and 2D. Furthermore, the use of a CMOS type multiplexer is shown, but as will be appreciated by those skilled in the art, other types of multiplexers such as CCD type or NMOS or other variance of conventional multiplexers may be employed as well.

The number of elements in the array, N, is chosen for the range of velocity-to-height (V/H) values required by airborne missions and applications. In FIG. 2A, the array is shown to have approximately 300 elements on the average. The size of the individual detectors is chosen to provide the required instantaneous field of view angle. The detectors are shown to be square in the preferred embodiments of 2A, but generally rectangular detector shapes can also be used providing that the shape does not approach a thin rectangle. Usually, the detector width in the across track (ACT) dimension is no less than 0.6 of the ALT dimension. The detector size for a square detector is simply $s = f\omega$, where f is the telescope focal length and $\omega$ is the detector instantaneous field of view (IFOV) in radians. For the F/1.0 system of the preferred embodiment, the focal length equals the aperture diameter, namely six inches, and if $\omega$ is the required instantaneous field of view (IFOV), then the square detector size is $s = 6\omega$. For example, if $\omega = 1 \times 10^{-4}$ radian then $s = 6 \times 10^{-4}$ inch in the preferred embodiment.

Referring now to FIG. 5, a schematic block diagram of the signal processing apparatus as provided by the invention is shown. Apparatus used in the signal processing include the focal plane PV array 30, the focal plane multiplexer switch 34 a clock 52, analog-to-digital converters 54, shaft encoder 60, V/H data from the vehicle initial navigation system (INS), address control 64, programmable read-only memory (PROM) devices 66, and digital frame buffer 68. The clock and V/H input data may be provided externally from other avionics carried by the aircraft. In the example of a 300 element array, it is convenient to read out the individual detector signals in groups of 50 into six processing channels. The readout is synchronous so that for any given time it is possible to recover the signal for any detector element. The six analog signal channels are synchronously digitized and the information is read into a digital frame buffer memory under dynamic address control from a memory device, such as a programmable read only memory (PROM), such that the digital signal from each detector is placed into a specific memory location for each clock pulse from the clock 52. The PROMS 66 contain an algorithm for address control 64, to correct for time delays resulting from the apparent rotation of the array, and to correct for the variable ALT angular subtense of the array as the scan progresses from one horizon to the other. In addition, the digital signal processing controlled by the PROM provides for the use of delay-and-add signals in a conventional manner to provide signal-to-noise ratio improvement at or near the extremes of the scan. The use of well-known delay-and-add techniques becomes effective at scan angles beyond 60° and progressively increases until at the edge of the scan, the signals from all N detectors are combined in the memory into a single memory cell.

Figure 3:
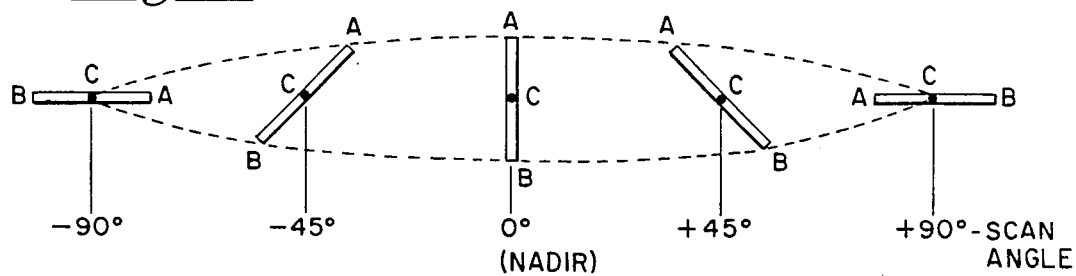
FIG. 3 diagrams a projected image on the ground of a linear array, as employed in one aspect of the invention, showing the effects of apparent rotation of the linear array as scanning progresses from scan angles of −90° to +90° through nadir.
Figure 4:
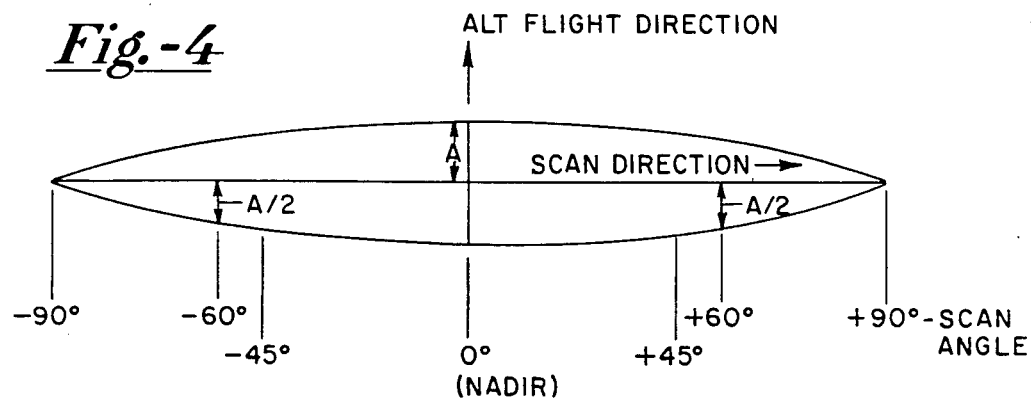
FIG. 4 shows a scan pattern in accordance with the teachings of the present invention wherein the scan pattern provides desired angular coverage of the ground in the along track (ALT) dimension for continuous coverage of the ground and for providing a constant ALT swath width ground footprint per scan.

Referring now to FIG. 3, a diagram of the projected image 50 of a linear array as it rotates 180° on a flat earth below the aircraft as scanning progresses from −90° to +90° through nadir is shown At the left edge of the scan field of view at −90° scan angle, the scanner views toward the left horizon. At this time the array is aligned in parallel to the scan direction as shown in FIG. 3, with the B-side of the array closest to the left horizon. As the scan progresses towards nadir the array is effectively rotated with respect to the image such that at nadir it has appeared to rotate a full +90°. In actual fact, the scene image rotates across the fixed array. As the scan continues past nadir, the array appears to continue to rotate until, at the right edge of the scan field of view, the array appears to be rotated an additional 90° such that the B-side of the array is pointing to the right horizon.

In operation, the invention stores displacement coordinates for each sampled signal for each detector cell at any given period in time. The displacement coordinates reference the cell position at the given time period to the array center, c, and are used by the address control algorithm 64 to correct for displacement of the sample signal caused by the apparent rotation of the detector prior to loading the signal data into the digital frame buffer 68. The digital frame buffer then outputs the signal data which has now been corrected for array rotation defects to a display, recorder, or other output device wherein straight roads, etc. will appear undistorted and not s-shaped as the case in the prior art.

FIG. 6 illustrates the derivation of array displacement coordinates as used in the signal processing method and apparatus of the invention. Initially, it is important to determine $\phi_{ALT}$, which is the along track angular coverage per scan. In one example, the linear ground subtense in the ALT dimension is $S = R \ \phi_{ALT}$ = constant 2.5 feet for V = 1000 feet/s and a line scan period, $T_L = 2.5$ MS at a scan rate of 400 scans per second. The present invention provides means for a 10 fold reduction in required shaft speed to 40 scans per second (i.e., 40 rps or 2400 rpm) by increasing the number of detectors used in the linear array by 10 times. Therefore, in this example:

$$\phi_{ALT} = (V/H)_{MAX} \cos \theta / n$$

where n = 40 scan/s for preferred embodiment
$\theta$ = scan angle from nadir.

Image rotation causes the array to sample in a displaced manner from that of an unrotated scanner. These displacements are called $\delta x$ and $\delta y$ in general and depend on both $\theta$ and on the cell position in the array (referenced to array center) as shown in the equation below. Note that for intermediate detectors, the $\delta x_i$ and $\delta y_i$ are proportional to detector position from center C, namely $y_i$ and may be solved by proportional triangles as follows:

$$\sin \theta = \delta X/(\phi_{ALT}/2), \ \delta x = (\phi_{ALT}/2) \sin \phi$$

$$\cos \theta = y/(\phi_{ALT}/2), \ y = (\phi_{ALT}/2) \cos \phi$$

$$\delta y = (\phi_{ALT}/2) - y = (\phi_{ALT}/2)(1 - \cos \theta)$$

where
- θ is the scan angle from nadir, and
- $\phi_{ALT}$ is the along track angular coverage per scan,
- y is the detector position referenced to the center of the array and, hence, may be either positive or negative in value,
- δy is the along track (ALT) displacement coordinate, and
- δx is the across track (ACT) displacement coordinate.

The values $\delta x_i$ and $\delta y_i$ are computed during the design of specific embodiments of the invention and are advantageously stored in a PROM for each of the p discrete values of $\theta_i$ from $-90°$ to $+90°$. The value of p is the total number of discrete digitally sample signals from each individual detector during any one scan. During the scan from one horizon to the other the number of detectors of the multiplexed array which are sampled and stored will vary with the scan angle. The sampling of each detector is synchronous with the scan angle as it varies such that there are a total of p incremental angles in any scan and the value of the scan angle at any sampling time can be conveniently designated as $\theta_i$ where i varies from zero to p/2 on either side of the center of symmetry of the array, said center of symmetry of the array is aligned to point at nadir during the center of the opto-mechanical scan. The number of total samples taken across a scan line and the number of detectors used at any particular scan angle, $\theta_i$, are design parameters of the invention and are selected during design to meet the particular application and mission requirements.

A typical application, summarized in Table 1, might require a nominally constant ground resolution approximately equal to one foot. If the aircraft altitude is H = 400 feet and the maximum slant range is:

R = 1500 meters = 4921.25 feet, while the footprint is

S = $R\omega_y$, where $\omega_y$ is the instantaneous field of view, or IFOV, of the detector in the ACT dimension and S is taken normal to the line of sight. In this example, S = 1.23 feet at the maximum slant range of 4921.25 feet when the IFOV, $\omega_y$, is equal to 0.25 milliradian. This occurs at a scan angle of:

$\theta_p = \cos^{-1}(400/4921.25) = \pm 85.34°$ which is near the left or right horizon, depending on the sign. At nadir viewing the range is simply equal to the aircraft altitude, or 400 feet in this example. There is considerable optical defocus at this close range because the scanner telescope of the invention is set for infinity focus. The defocus itself has a footprint which in the along track dimension is simply the size of the along track aperture itself. In this example, the ALT aperture is 6 inches, i.e., 0.5 feet. Thus, the resulting footprint at nadir for a single detector IFOV is:

$$S = R\omega_y + \text{defocus footprint} = H\omega_y + \text{defocus footprint}$$
$$= 400(0.00025) + 0.5 = 0.6 \text{ feet}$$

In this example, two adjacent detector channels are summed to approximate the desired nominal one foot size for the constant ground footprint giving, at the nadir position, a ground footprint of 1.2 feet. Summing in the across track (ACT) dimension is not required because the electrical signal sampling is adjusted to meet the requirements of the application during design such that the ACT scene resolution is determined by the electrical bandwidth of the detector and the signal processing electronics.

The previously stored correction coordinates, $\delta x_i$ and $\delta y_i$ for each scan position and each detector in use are used dynamically by the address control circuits during loading of the frame buffer prior to readout of a frame of imagery. The $\delta x_i$ and $\delta y_y$ values are stored in the PROM for each value of $\theta_i$ from $-90°$ to $+90°$ and for each value $y_i$ denoting detector position from the array center. The value of $\theta_i$ is obtained dynamically during the scan by taking an appropriately conditioned signal from the shaft encoder such that the scan mirror position is available for determination of the proper address for the required correction coordinates.

If the V/H ratio changes for any reason, it is a feature of the invention that the PROM need not be reloaded. The PROM is loaded only once with correction values appropriate to the maximum V/H value and a scaling factor, k, is computed using a V/H signal obtained from the aircraft inertial navigation system, or alternatively, from a V/H sensor. The scaling factor, k, is unity for the maximum V/H ratio and in general, $$k = \frac{(V/H)_{current}}{(V/H)_{max}}$$

where $(V/H)_{current}$ is the value of the V/H ratio at any instant as determined by the aircraft inertial measurement system.

TABLE 1

| | | | Typical System Parameters vs. Scan Angle θ n = 40 scan/s, (V/H)$_{MAX}$ = 4.8 rad/s = 4800 mr/s, $\phi_{ALT}$ = 4800/40 = 120 mr | | |
|---|---|---|---|---|---|
| θ (±) Degrees from Nadir | sin θ | cos θ | $\phi_{ALT}$(mr) = (V/H)$_{MAX}$ cos θ/40 | δx = ($\phi_{ALT}$/2)$_{MAX}$ sinθ = 60 sinθ | δy = ($\phi_{ALT}$/2)$_{MAX}$(1−cosθ) = 60 (1−cosθ) |
| 0 | 0 | 1 | 120.00 | 0.00 | 0.00 |
| 10 | 0.17365 | 0.98481 | 118.18 | 10.42 | 0.91 |
| 20 | 0.34202 | 0.93969 | 112.76 | 20.52 | 3.62 |
| 30 | 0.50000 | 0.86603 | 103.92 | 30.00 | 8.04 |
| 40 | 0.64279 | 0.76604 | 91.93 | 38.57 | 14.04 |
| 50 | 0.76604 | 0.64279 | 77.13 | 45.96 | 21.43 |
| 60 | 0.86602 | 0.50000 | 60.00 | 51.96 | 30.00 |
| 70 | 0.93969 | 0.34202 | 41.04 | 56.38 | 39.48 |
| 80 | 0.98481 | 0.17365 | 20.84 | 59.09 | 49.58 |
| 90 | 1 | 0 | 0.00 | 60.00 | 60.00 |

Note:
δx and δy values are symmetrical about nadir and take their algebraic sign from θ. θ, the scan angle is measured from nadir + or − and detector position in the array is referenced to array center.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to without departing from the scope of the invention itself.

What is claimed is:

1. An improved line scanner for airborne radiation sensitive systems comprising:
   (a) means for focusing radiation having an optical axis;
   (b) a spin mirror included at about 45° to the optical axis;
   (c) a detector array comprising a plurality of radiation detector cells which provide a plurality of synchronously sampled signals representing the radiation impinging on the detector at any given time;
   (d) a multiplexer assembly having a plurality of multiplexer channels wherein each multiplexer channel is connected to one of the detector cells so as to receive the synchronously sampled signals;
   (e) means for converting the sampled signals into digital radiation signals;
   (f) a shaft encoder for providing positional data representing the spin mirror orientation at any given time;
   (g) means for providing velocity-to-height data;
   (h) memory means for storing the digital radiation signals together with synchronous positional data including array displacement coordinate information corresponding in time to each portion of the digital radiation signal and for storing the velocity-to-height data;
   (i) a frame buffer; and
   (j) address control means arranged to load data into the frame buffer for correction of time delays resulting from the apparent array rotation by compensating for the time delays through applying the displacement information to the corresponding sampled signal in accordance with the following equations $$\sin \theta = \delta x/(\phi_{ALT}/2), \ \delta x = (\phi_{ALT}/2) \sin \theta$$

$$\cos \theta = y/(\phi_{ALT}/2), \ y = (\phi_{ALT}/2) \cos \theta$$

$$\delta y = (\phi_{ALT}/2) - y = (\phi_{ALT}/2)(1 - \cos \theta)$$

where
   $\theta$ is the scan angle from nadir,
   $\phi_{ALT}$ is the along track angular coverage per scan,
   y is the detector position referenced to the center of the array,
   $\delta y$ is the along track displacement coordinate, and
   $\delta x$ is the across track displacement coordinate.

2. The apparatus of claim 1 wherein each of the elements (a) through (j) are mounted in a cylindrical housing.

3. The apparatus of claim 1 wherein the means for focusing radiation comprises an infrared focusing lens assembly having an optical speed in the range of about F/1.0 to F/1.5.

4. The apparatus of claim 1 wherein the means for focusing radiation comprises a folded catadioptric telescope.

5. The apparatus of claim 1 wherein the means for focusing radiation comprises a folded all reflective telescope.

6. The apparatus of claim 1 wherein the detector array is structured and arranged to be a single linear array connected by TEL connections to the multiplexer assembly.

7. The apparatus of claim 6 wherein the single linear array comprises collinear detector cells and wherein the number of cells is in the range of about 100 to about 600 cells.

8. The apparatus of claim 6 wherein the detector array consists substantially of PV HgCdTe material.

9. The apparatus of claim 1 wherein the detector array is comprised of a staggered array having at least two staggered lines of detectors forming a focal plane array.

10. The apparatus of claim 9 wherein the focal plane array is bump bonded with bump interconnects to the multiplexer assembly.

11. An improved line scanner for airborne radiation sensitive systems for scanning a scene from left to right horizons including a plurality of single scene elements comprising:
    (a) means for focusing radiation having an optical axis;
    (b) a spin mirror included at about 45° to the optical axis;
    (c) a detector array comprising a plurality of radiation detector cells which provide a plurality of synchronously sampled signals representing the radiation impinging on the detector at any given time;
    (d) a multiplexer assembly having a plurality of multiplexer channels wherein each multiplexer channel is connected to one of the detector cells so as to receive the synchronously sampled signals;
    (e) means for converting the sampled signals into digital radiation signals;
    (f) a shaft encoder for providing positional data representing the spin mirror orientation at any given time;
    (g) means for accepting and conditioning a velocity-to-height signal from a system external to the invention;
    (h) memory means for storing the digital radiation signals together with synchronous positional data including array displacement coordinate information corresponding in time to each portion of the digital radiation signal and for storing the velocity-to-height data;
    (i) a frame buffer; and
    (j) address control means arranged to load data into the frame buffer for correction of time delays resulting from the apparent array rotation by compensating for the time delays through applying the displacement information to the corresponding sampled signal in accordance with the following equations $$\sin \theta = \delta x/(\phi_{ALT}/2), \ \delta x = (\phi_{ALT}/2) \sin \theta$$

$$\cos \theta = y/(\phi_{ALT}/2), \ y = (\phi_{ALT}/2) \cos \theta$$

$$\delta y = (\phi_{ALT}/2) - y = (\phi_{ALT}/2)(1 - \cos \theta)$$

where
    $\theta$ is the scan angle from nadir, $\phi_{ALT}$ is the along track angular coverage per scan,
y is the detector position referenced to the center of the array,
δy is the along track displacement coordinate, and
δx is the across track displacement coordinate;
(k) means for selecting detector signal channels; and
(l) means for combining detector signals, said equations used in conjunction with detector signal channel selection and signal combination means so as to provide an approximately constant ground footprint of each scan swath throughout a scan from one horizon to the other and so as to provide enhanced signal-to-noise ratio for those portions of the scan between the left horizon and −60° scan angle and between +60° and the right horizon, said signal-to-noise ratio improvement being a factor of the square root of n at either horizon and less elsewhere, where n is the number of detector signals being combined to represent a single scene element.

12. The apparatus of claim 11 wherein each of the elements (a) through (l) are mounted in a cylindrical housing.

13. The apparatus of claim 11 wherein the means for focusing radiation comprises an infrared focusing lens assembly having an optical speed in the rang of about F/1.0 to F/1.5.

14. The apparatus of claim 11 wherein the means for focusing radiation comprises a folded catadioptric telescope.

15. The apparatus of claim 11 wherein the means for focusing radiation comprises a folded all reflective telescope.

16. The apparatus of claim 11 wherein the detector array is structured and arranged to be a single linear array connected by TEL connections to the multiplexer assembly.

17. The apparatus of claim 16 wherein the single linear array comprises collinear detector cells and wherein the number of cells is in the range of about 100 to about 600 cells.

18. The apparatus of claim 16 wherein the detector array consists substantially of PV HgCdTe material.

19. The apparatus of claim 11 wherein the detector array is comprised of a staggered array having at least two staggered lines of detectors forming a focal plane array.

20. The apparatus of claim 19 wherein the focal plane array is bump bonded with bump interconnects to the multiplexer assembly.

* * * * *

UNITED STATES PATENT AND TRADEMARK OFFICE
CERTIFICATE OF CORRECTION

PATENT NO. : 5055,683
DATED : October 8, 1991
INVENTOR(S) : William L. McCracken It is certified that error appears in the above-identified patent and that said Letters Patent is hereby corrected as shown below:

Column 10, line 64 Equation should read:

$$\sin \theta = \delta x/(\phi_{ALT}/2), \; \delta x = (\phi_{ALT}/2) \sin \theta$$

Column 10, line 67 Equation should read:

$$\cos \theta = y/(\phi_{ALT}/2), \; y = (\phi_{ALT}/2) \cos \theta$$

Column 12, line 24 $\delta y_y$ should read:

$$\delta y_i$$

Column 13, line 6 insert after the words "as to" the words "the equipment details and operating procedures, can be accomplished"

Column 16, line 1 rang should read:

range

Signed and Sealed this

Second Day of March, 1993

*Attest:*

STEPHEN G. KUNIN

*Attesting Officer*   Acting Commissioner of Patents and Trademarks